United States Patent [19]

Garnjost

[11] Patent Number: 4,567,813
[45] Date of Patent: Feb. 4, 1986

[54] PRESSURE EQUALIZATION OF MULTIPLE VALVES

[75] Inventor: Kenneth D. Garnjost, Orchard Park, N.Y.

[73] Assignee: Moog Inc., East Aurora, N.Y.

[21] Appl. No.: 375,368

[22] Filed: May 6, 1982

[51] Int. Cl.⁴ ............................ F15B 9/03; F15B 9/09
[52] U.S. Cl. .................................... 91/363 A; 91/509; 91/522; 91/433; 137/596.16
[58] Field of Search .................. 91/361, 363 R, 363 A, 91/390, 433, 510, 532, 516, 522, 509; 137/596.16, 596.14, 596.17

[56] References Cited

U.S. PATENT DOCUMENTS

| | | | |
|---|---|---|---|
| 2,931,343 | 4/1960 | Moog | 137/82 |
| 3,138,002 | 6/1964 | Ernst et al. | 91/510 |
| 3,228,423 | 1/1966 | Moog | 137/625.62 |
| 3,257,911 | 6/1966 | Garnjost et al. | 91/48 |
| 3,270,623 | 9/1966 | Garnjost et al. | 91/387 |
| 3,385,171 | 5/1968 | Wood | 91/510 |
| 3,542,051 | 11/1970 | McFadden et al. | 137/83 |
| 3,612,103 | 10/1971 | Waddington | 137/625.63 |
| 3,741,073 | 6/1973 | Garnjost | 91/363 A |
| 3,898,916 | 8/1975 | Renner | 91/509 |
| 4,205,590 | 6/1980 | Stegner | 91/359 |
| 4,243,855 | 1/1981 | Gratzmuller | 91/433 |

OTHER PUBLICATIONS

Technical Bulletin 127, Moog Inc., (1976).

Primary Examiner—Paul E. Maslousky
Attorney, Agent, or Firm—Sommer & Sommer

[57] ABSTRACT

An equalizer is arranged to continuously sense the control pressures of two valves. In the event of a differential between the control pressures, the equalizer operates to selectively adjust one valve so that the control pressures of both valves will thereafter be substantially equal.

20 Claims, 8 Drawing Figures

PRESSURE EQUALIZATION OF MULTIPLE VALVES

BACKGROUND OF THE INVENTION

1. Field of the Invention

The present invention relates generally to the field of equalizers for equalizing the output pressures of at least two valves, and more particularly to an improved equalizer which is particularly adapted for use in a redundant force-summed control system.

2. Description of the Prior Art

In earlier years, flight control surfaces, such as rudders, elevators and ailerons, were mechanically connected to the pilot's hand controls. Such mechanical systems have been largely replaced by electrohydraulic servosystems, in which the pilot's commands are transmitted electrically to servoactuators. While such "fly-by-wire" servosystems offer the advantage of increased performance, it has been appreciated that a failure of one component can have a dramatic adverse effect on system performance. Concerns for safety have led to the development of redundant (i.e., multiple channel) servosystems, such that effective control may be continued notwithstanding a failure in one system component. As described in Technical Bulletin 127, entitled "Redundant Electrohydraulic Servoactuators", Moog Inc. (1976), such servoactuators have heretofore been provided with "simple parallel", "averaging", "majority voting", "mid-value", "detection-correction", and "hydrid" types of redundancy. All of these approaches seek to permit continued control, albeit sometimes at the expense of some aspect of performance, in the event of a failure in a system component.

Some of these earlier approaches are also disclosed in U.S Pat. Nos. 3,257,911, 3,270,623 and 3,741,073.

SUMMARY OF THE INVENTION

The present invention provides an improved equalizer, which is adapted to cause two or more valves, each having one member movable relative to another, to have substantially equal output pressures.

The improved equalizer is arranged to continuously sense the control pressures of the valves, and is operative, in the event of differential between such control pressures, to cause the relative positions of at least one of the valves to be adjusted so that the control pressure provided by such valve will thereafter substantially equal the control pressure provided by another valve. A valve, whose hydraulic output is less than the hydraulic output of another valve, may be "equalized up" to the higher output of the other valve. Alternatively, a valve whose hydraulic output is greater than the hydraulic output of another valve, may be "equalized down" to the lower output of such valve. Thus, in a system employing two or more valves, the hydraulic output of one valve is used as a reference, and the other valves are slaved to have their hydraulic outputs agree with that of the reference valve.

Accordingly, the general object of the invention is to provide an equalizer for causing the output pressure of two or more valves to be substantially equal to one another.

Another object is to provide an improved equalizer which is particularly adapted for use in a redundant control system.

Another object is to provide an improved equalizer which is particularly useful in providing equal pressures to a force summed tandem actuator, so that "force-fighting" attributable to a pressure mismatch will be substantially eliminated.

These and other like objects and advantages will become apparent from the foregoing and ongoing written description, the drawings and the appended claims.

DESCRIPTION OF THE PREFERRED EMBODIMENTS

Figure 1:
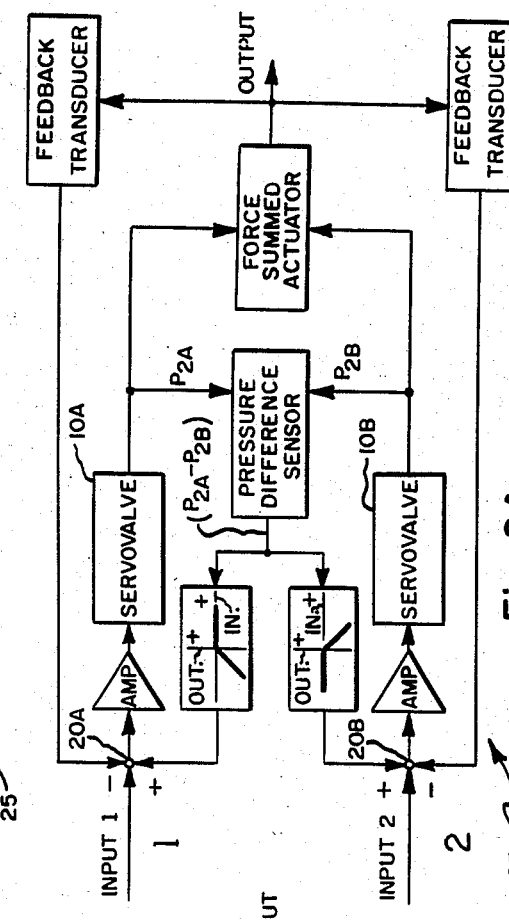
FIG. 1 is a simplified schematic of a prior art "averaging" equalizer.

At the outset, it should be clearly understood that like reference numerals are intended to identify the same elements and/or structure consistently throughout the several drawing figures, as such elements and/or structure may be further described or explained by the entire written specification, of which this detailed description is an integral part. Expressions such as "up", "down", "left", "right", and the like, are oriented to the appropriate drawing figure, as it faces the reader.

As used herein, the term "valve" is intended broadly. Hence, an "electrohydraulic servovalve" is only one example of a "valve". In general, "valves" have one member movable relative to another member. In an "electrohydraulic servovalve", such members may typically include: a spool movable relative to a body (e.g., U.S. Pat. No. 2,931,343); a sleeve movable relative to a body (e.g., U.S. Pat. No. 4,205,590); a spool movable relative to a sleeve (e.g., U.S. Pat. No. 3,228,423); a jet pipe movable relative to a body (e.g., U.S. Pat. No. 3,612,103); a deflector surface movable relative to a body (e.g., U.S. Pat. No. 3,542,051 and so forth. Also, the term "servovalve" is intended to encompass single-stage and multiple-stage designs. Since a "valve", and specifically a "servovalve", may service a variety of "fluids" (both liquids and gases), the claims should not be limited to serviced liquids, unless a suitable limitation to that effect appears therein.

PRIOR ART "AVERAGING" SYSTEM (FIGS. 1–1A)

A simplified prior art "averaging" system is schematically shown in FIG. 1. This system included two electrohydraulic servovalves 10A, 10B, an "averaging" equalizer 11, and a tandem actuator or load 12. The tandem actuator 12 had two pistons mounted on a common rod 13 and arranged in separate cylinders. The left piston separated opposing chambers 14A, 14B and the right piston separated opposing chambers 15A, 15B. Two separate linear variable displacement transducers (LVDT's) provided feedback signals reflective of the actual position of rod 13 relative to the body. The equalizer 11 was another type of tandem actuator, responsive to the difference of output pressures rather than the sum; and had left and right pistons separating opposing chambers 16A, 16B and 18A, 18B. Two separate LVDT's provided feedback signals reflective of the position of the common equalizer rod 19 relative to the body.

An electrical command signal was supplied to summing point 20A, which was also supplied with separate feedback signals from the actuator and the equalizer. The algebraic sum of these three signals was an error signal supplied through an amplifier 21A to the torque motor of servovalve 10A. The same electrical command signal was supplied to summing point 20B, which was also supplied with separate feedback signals from the actuator and the equalizer. The algebraic sum of these separate signals was supplied through an amplifier 21B to the torque motor of servovalve 10B.

The two servovalves were identical, and were severally adapted to produce control pressure outputs $P_{1A}$, $P_{2A}$ and $P_{1B}$, $P_{2B}$. Ideally, output $P_{1A}$ was equal to $P_{1B}$, and output $P_{2A}$ was equal to $P_{2B}$. Output $P_{1A}$ was supplied to equalizer chamber 16A and to actuator chamber 14A; output $P_{2A}$ was supplied to equalizer chamber 16B and to actuator chamber 14B; output $P_{1B}$ was supplied to equalizer chamber 18B and to actuator chamber 15A; and output $P_{2B}$ was supplied to equalizer chamber 18A and to actuator chamber 15B. Thus, these hydraulic outputs were arranged to be "force summed" in the actuator, but "force opposed" in the equalizer.

If the hydraulic outputs of the two servovalves were perfectly "matched" (i.e., $P_{1A}=P_{1B}$, $P_{2A}=P_{2B}$), then the equalizer would not move relative to the body. However, the actuator rod 13 would move to a position established by the command signal, at which commanded position the actuator feedback signal would reduce the error signal to zero.

However, if the hydraulic outputs of the servovalve became "mismatched" (i.e., $P_{1A}\neq P_{1B}$ and/or $P_{2A}\neq P_{2B}$), for whatever reason, then the differential between such output pressures would displace the equalizer rod 19 in the appropriate direction relative to the body. Such displacement caused equal feedback signals, but of opposite polarity, to be supplied to summing points 20A and 20B, and these in turn caused different error signals to be supplied to the servovalves. The output of the lower-pressure valve was increased, while the output of the higher-pressure valve was correspondingly decreased by a like amount. The effect of this was to "equalize" the outputs of the valves at an intermediate pressure which was the average of the original mismatched pressures. The prior art equalizer functioned to avoid "force fighting" of mismatched control pressures in the actuator by causing both valves to produce "averaged" equal outputs.

A disadvantage of the "averaging" system was that the equalizer rod 19 had to be "locked" in a fixed position to allow for continued system performance in the event of a loss of supply pressure $P_{SA}$, $P_{SB}$ to either servovalve. To this end, the prior art equalizer was provided with two locking mechanisms 22A, 22B. Each locking mechanism employed supply pressure provided to the associated servovalve, to displace a piston against the opposite urging of a spring. In these displaced conditions, the locking pistons would permit the contemplated movement of the actuator rod 9 relative to the body. However, in the event of a loss of supply pressure to either valve, the associated piston would move upwardly to capture a pin within a piston detent, thereby holding the equalizer rod 19 in a fixed position relative to the body. These locking mechanisms functioned to prevent the equalizer LVDT's from sending "hardover" feedback signals to the summing points, if supply pressure to either servovalve was lost.

Figure 1A:
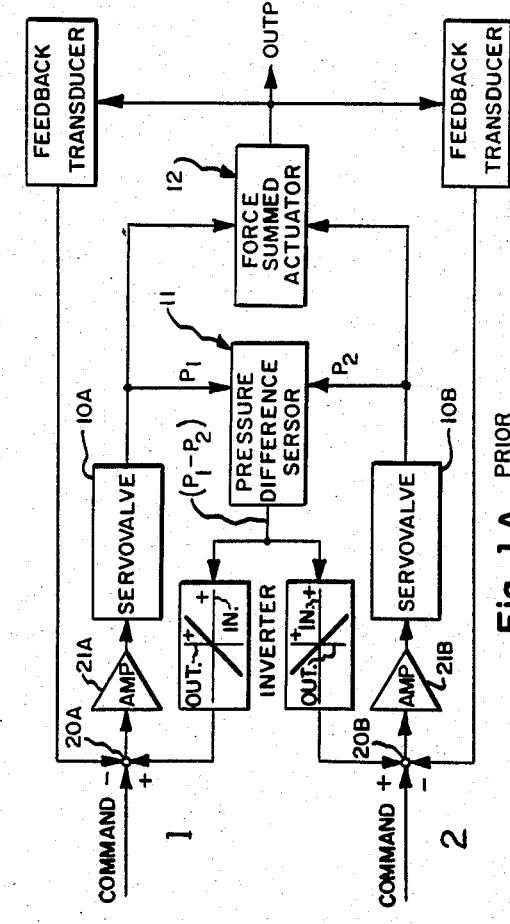
FIG. 1A is a simplified block diagram of the "averaging" equalizer shown in FIG. 1.

FIG. 1A is an abbreviated block diagram of the prior "averaging" system shown in FIG. 1. An electrical command signal was simultaneously supplied to each of summing points 20A, 20B, which supplied error signals through amplifiers 21A, 21B to servovalves 10A, 10B. The equalizer 11 sensed a pressure differential ($\Delta P$) in the hydraulic outputs of the valves, and displaced equalizer rod 19 accordingly. This caused the equalizer LVDT's to supply equal negative feedback signals to the summing points. The hydraulic outputs of the valves were "force summed" in actuator 12 to displace the actuator rod 13 relative to a body. The actuator LVDT's supplied negative feedback signals reflective of the actual position of the actuator rod, to the associated summing points. Note that the equalizer LVDT's supplied proportional feedback signals over the entire range of movement of the equalizer rod. Thus, movement of the equalizer rod caused one of the servovalves to increase its hydraulic output at the expense of a corresponding decrease in the hydraulic output of the other.

As previously noted this prior art system has been somewhat simplified to more clearly illustrate the "averaging" correction of a hydraulic mismatch. Such prior art system is more clearly shown of pp. 20–21 of Technical Bulletin 127, Moog Inc. (1976).

IMPROVED EQUALIZATION SYSTEM (FIGS. 2–2A)

Figure 2:
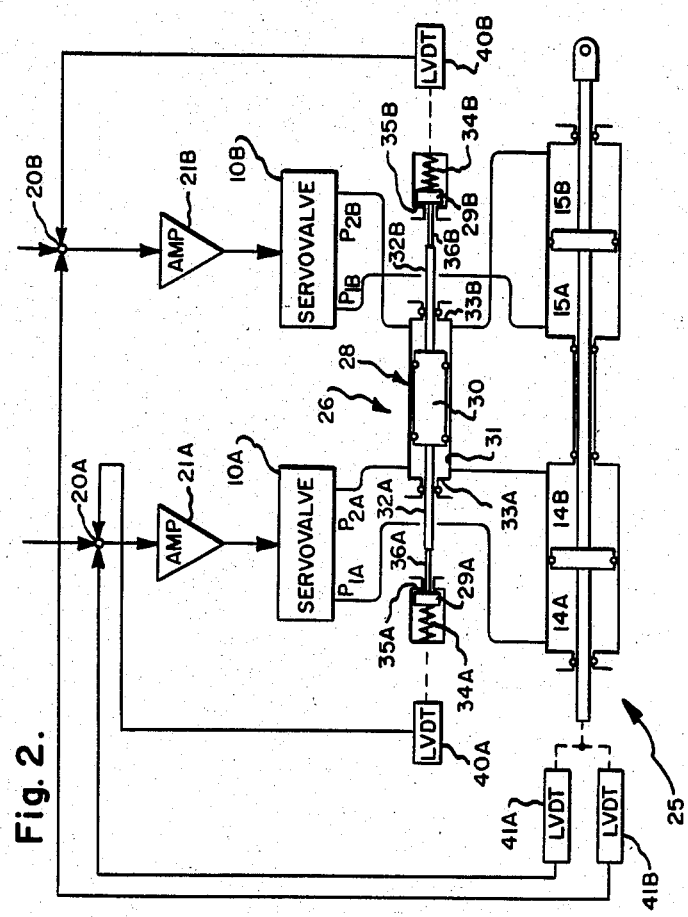
FIG. 2 is a simplified schematic of an improved equalizer, which selectively causes the valve which is producing the lower output pressure to be "equalized up" so that its output will substantially equal the output of the other valve.

A simplified schematic of the improved actuator is shown in FIG. 2, in which parts previously described are again referred to by the same reference numeral.

Whereas the prior art system (FIG. 1) corrected a hydraulic "mismatch" by adjusting both valves so as to produce equal outputs at an "average" of the original "mismatch", the improved equalizer adjusts only one of the valves so as to cause its hydraulic output to substantially equal that of the other. In other words, in the event of a hydraulic "mismatch", the lower-pressure valve may be adjusted so as to increase its hydraulic output to that of the higher-pressure valve, or vice versa, depending on the particular application. After such adjustment, both valves will thereafter produce substantially equal or "matched" output pressures equal to the original pressure of the non-adjusted valve.

The inventive system, generally indicated at 25 in FIG. 2, again includes summing points 20A, 20B, arranged to be simultaneously supplied with a command signal, and arranged to supply error signals through amplifiers 21A, 21B to servovalves 10A, 10B. The hydraulic outputs $P_{1A}$, $P_{2A}$ of servovalve 10A are supplied to actuator chambers 14A, 14B respectively; and the hydraulic outputs $P_{1B}$, $P_{2B}$ of servovalve 10B are supplied to actuator chambers 15A, 15B respectively.

Again, these hydraulic outputs are "force summed" in the actuator.

However, the system 25 utilizes an improved equalizer, generally indicated at 26, which includes a differential pressure sensing piston 28, and left and right rectifier elements 29A, 29B, which are severally responsive to the polarity of the hydraulic "mismatch". The expression "rectifier element", as used herein, is coined because these mechanical elements function in a manner somewhat analogous to a rectifier in an electrical environment. Persons skilled in this art will appreciate that a conventional rectifier permits passage of a current in one direction, but not in another. Thus, if a sinusoidal a.c. current, symmetrical about an abscissa, is supplied to a rectifier, the rectifier will clip that part of the signal which is above or below the abscissa and pass a half-wave rectified signal. Similarly, elements 29A, 29B are severally sensitive to movement of the sensing piston in one direction, but not in the opposite direction. Hence, the use of "rectifier element" as a shorthand metaphoric identification and characterization of such element.

The differential sensing piston 28 has a central piston 30 slidably mounted in a cylindrical chamber 31 provided in a body. Axial rods 32A, 32B extend leftwardly and rightwardly from piston 30 and slidably penetrate the left and right end walls 33A, 33B of the chamber.

The left rectifier element 29A is biased, by a spring 34A, to move rightwardly so as to abut a leftwardly-facing stop 35A. An axial pin 36A extends rightwardly from rectifier element 29A, and is adapted to be selectively engaged by the left end face of rod 32A. Similarly, the right rectifier element 29B is biased, by spring 34B, to move leftwardly so as to abut a rightwardly-facing stop 35B. Axial pin 36B extends leftwardly from rectifier element 34B, and is adapted to be selectively engaged by the right end face of rod 32B. The rectifier pins 36A, 36B are biased to continuously engage sensing piston rods 32A, 32B respectively, unless and until the sensing piston moves away from the pin after its associated rectifier element abuts its movement-limiting stop.

Ideally, when the sensing piston 30 is in an initial position (e.g., centered with respect to its cylinder), the tips of rectifier pins 36A, 36B will engage the facing ends of rods 32A, 32B, respectively, and the left and right rectifier elements will just abut their associated stops, 35A, 35B. This initial condition is not, however, invariable. The length of the various rods and pins might, alternatively, be selected or adjusted so that each rectifier element will engage its associated stop when the sensing piston (whether centered or not) is in some initial position. Thus, if the hydraulic outputs of the two servovalves are "matched", there will be no displacement of the sensing piston 30 relative to the body.

However, assume that the hydraulic outputs are, or become, "mismatched". For example, the output pressure ($P_{2B}$) of servovalve 10B might fall below the corresponding output ($P_{2A}$) of servovalve 10A. The differential ($P_{2A}-P_{2B}$) between these two pressures will urge the sensing piston 30 to move rightwardly (from the position shown in FIG. 2) relative to its cylinder. This will cause rod 32A to separate from left pin 36A. However, since the left rectifier element already abuts stop 35A, such rightward movement of the sensing piston will not cause any movement of the left rectifier element 29A, and the LVDT 40A associated with the left rectifier element will not produce any analog feedback signal. However, such rightward movement of sensing piston 30 will produce a like rightward movement of right rectifier element 29B, causing it to be lifted off its stop 35B. This movement will generate, via the right LVDT 40B, a feedback signal which is supplied to summing point 20B. Since the error signal supplied from summing point 20B to amplifier 21B is the algebraic sum of the command signal, the feedback signal supplied by right rectifier element LVDT 40B, and the negative feedback signal supplied by actuator LVDT 41B, such rightward movement of the sensing piston 30 causes an appropriate correction of the error signal supplied to servovalve 10B, which causes valve 10B to increase its output ($P_{2B}$) to equal that of valve 10A. In this manner, servovalve 10B, whose output pressure was assumed to be less than that of valve 10A, is adjusted so as to thereafter substantially equal the output of servovalve 10A. If the output ($P_{2A}$) of servovalve 10A were to fall below the output ($P_{2B}$) of valve 10B, the corrective operation, just described, would be reversed.

Figure 6:
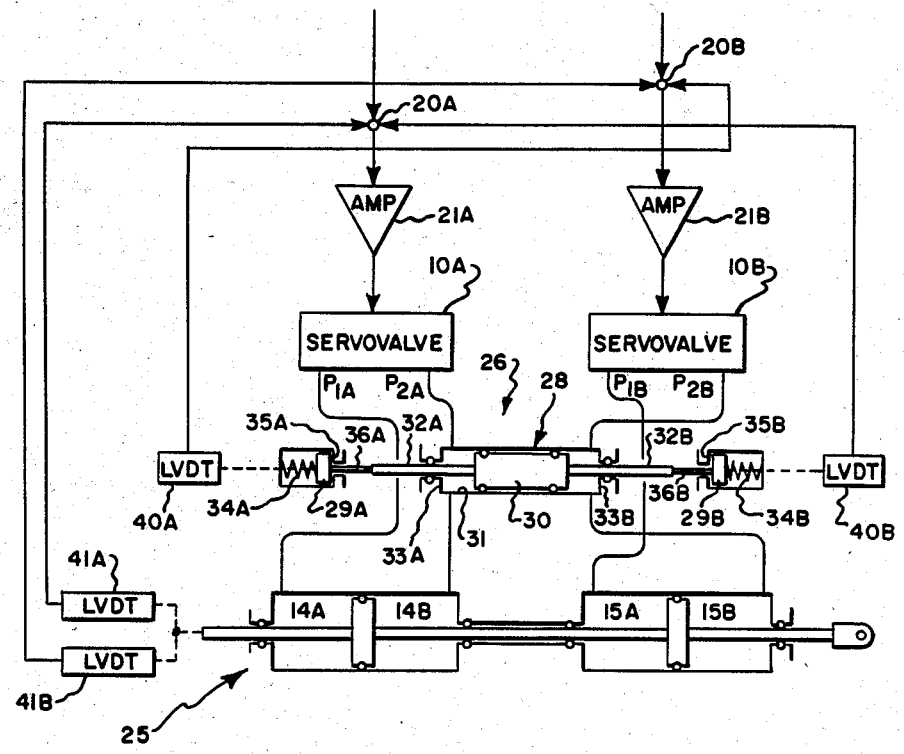
FIG. 6 is a simplified schematic, generally similar to FIG. 2, but showing a modified equalizer which causes the valve which is producing the higher output pressure to be "equalized down" so that its output will substantially equal the lower output of the other valve.

While in the preferred embodiment, the valve producing the lower pressure is singly and individually adjusted so as to produce an increased pressure equal to that of the other valve, persons skilled in this art will appreciate that the improved equalizer could be readily modified so as to cause a higher pressure valve to be adjusted so that its output pressure would be reduced so as to substantially equal the lower pressure of another valve. For example, this "equalize down" feature may be achieved by reversing the connections between the equalizer LVDT's (40A, 40B) and the summing points (20A, 20B), from that shown in FIG. 2 to that shown in FIG. 6. In this modification, left LVDT 40A is arranged to supply an appropriate feedback signal to right summing point 20B, and right LVDT 40B is arranged to supply an appropriate feedback signal to left summing point 20A, so that the higher pressure output of one valve will be reduced to substantially equal the lower pressure output of the other valve. The invention contemplates that one or more of the various feedback signals may be provided by means and mechanisms other than an LVDT. For example, a mechanical spring wire, such as disclosed in U.S. Pat. No. 3,023,782, might be employed to provide mechanical feedback from the equalizer as the actuator.

Thus, the preferred embodiment of equalizer 26 includes a bidirectional differential pressure sensing piston 30 which is operable to sense both the polarity and the magnitude of a "mismatch" through its direction of movement and extent of travel, and two rectifier elements 29A, 29B which, through associated LVDT's are adapted to generate "rectified" electrical signals only when the sensing piston moves within its sensitive range. Each rectifier element therefore has a selective "dead" zone, within which the element does not follow movement of the sensing piston; and a "sensitive" zone, within which the element moves with the sensing piston, and produces via its LVDT an output signal proportional to the displacement of sensing piston 30 in the sensitive direction. The "dead" and "sensitive" zones of the two rectifier elements are complementary; that is, one element is in its "dead" zone, while the other is in its "sensitive" zone. The interface between these two zones occurs when each rectifier element just abuts its associated stop (as shown in FIG. 2). Thus, when the hydraulic outputs of the servovalves are "matched", both rectifier elements will be at the interface between their respective "dead" and "sensitive" zones.

Figure 2A:
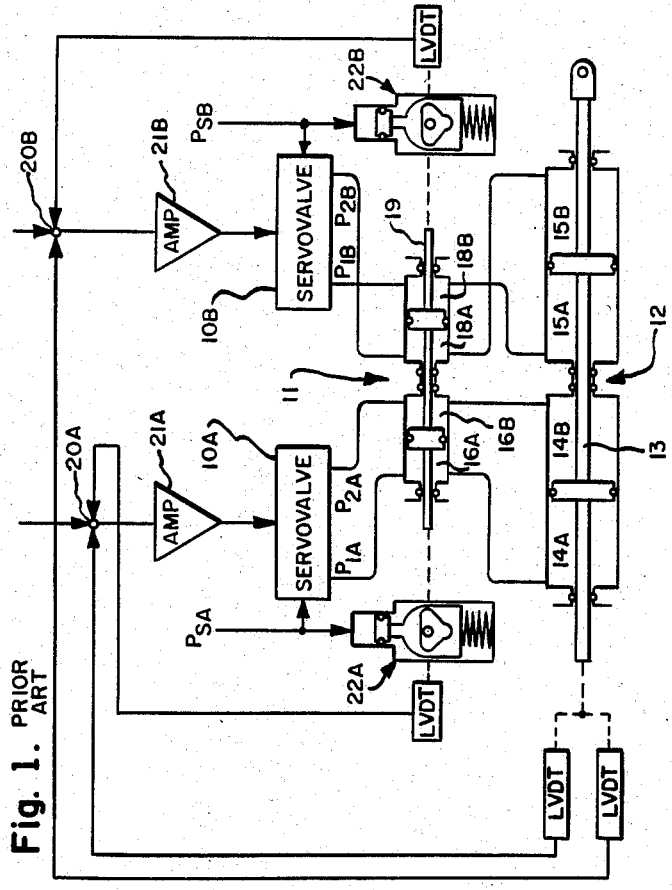
FIG. 2A is a simplified block diagram of the improved equalizer shown in FIG. 2.

FIG. 2A shows a simplified block diagram of the improved servosystem shown in FIG. 2. This block diagram appears to be similar to the prior art system shown in FIG. 1A. However, the difference lies in the equalizers. Whereas the two equalizer LVDT's provided proportional output signals throughout the entire range of movement of equalizer rod 19 in the prior art system (FIG. 1A); in the improved equalizer, only one LVDT is active when its associated rectifier element is moved in its "sensitive" zone. Therefore, while the prior art "averaging" system (FIGS. 1 and 1A) simultaneously adjusted both servovalves by like amounts in the event of a "mismatch", the improved system singly and independently adjusts only one valve, and causes such adjusted output to substantially equal that of the non-adjusted valve. By having each rectifier element LVDT sensitive to a differential pressure of known polarity, there is no need to make provision to lock the sensing piston, as had been done with the "averaging" system.

Figure 3:
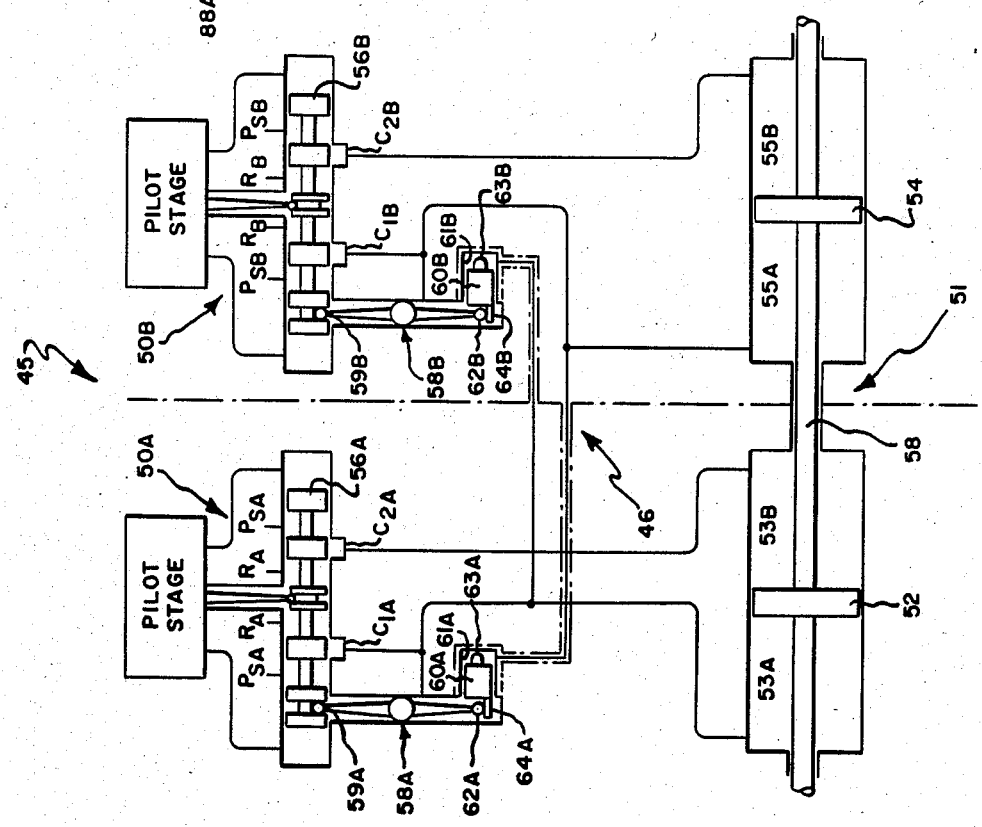
FIG. 3 is a simplified schematic of a first modification.

First Modification (FIG. 3)

A servosystem 45 employing a modified equalizer, generally indicated at 46, is schematically shown in FIG. 3.

This servosystem has two identical two-stage electrohydraulic servovalves 50A, 50B, the hydraulic outputs of which are "force-summed" to drive a tandem actuator 51. Actuator 51 has a leftward piston 52 separating opposing chambers 53A, 53B, and a rightward piston 54 separating opposing chambers 55A, 55B. Each servovalve has a first or pilot stage which is employed to selectively displace a spool, 56A or 56B, relative to a body or bushing to meter a flow of fluid between a pressure port ($P_S$), a return port (R), and two control ports ($C_1$, $C_2$) Both pilot stages are simultaneously supplied with a common command signal. Control port $C_{1A}$ communicates with actuator chamber 53A; control port $C_{2A}$ communicates with actuator chamber 53B; control port $C_{1B}$ communicates with actuator chamber 55A; and control port $C_{2B}$ communicates with actuator chamber 55B. The pressures at control ports $C_{1A}$ and $C_{2A}$ are denominated pressures $P_{1A}$ and $P_{2A}$, respectively. Similarly, the pressures at control ports $C_{1B}$ and $C_{2B}$ are denominated pressures $P_{1B}$ and $P_{2B}$, respectively. Thus, if a command signal causes the spools to move leftwardly from the positions shown in FIG. 3, the fluid will flow from sources $P_{SA}$ and $P_{SB}$ into actuator chambers 53B and 55B, respectively, to displace actuator rod 58 leftwardly.

In this embodiment, the improved equalizer 46 includes an intermediately-pivoted lever and a rectifier element operatively associated with each spool. The left lever 58A is provided with a spherical ball 59A at its upper end, which ball is captured in an annular recess provided in a spool lobe. The left rectifier elemant 60A is in the form of a piston slidably mounted in a cylinder 61A, and has its left face adapted to be engaged by the lower end 62A of lever 58A and is also exposed to control pressure $P_{1A}$. Control pressure $P_{1B}$ is applied to the right face of rectifier piston 60A. Similarly, the right rectifier element is also in the form of a piston 60B, slidably mounted in a cylinder 61B, and has its left face adapted to engage the lower end 62B of lever 58B and is also exposed to control pressure $P_{1B}$. Control pressure $P_{1A}$ is applied to the right face of rectifier piston 60B. The rectifier pistons are shown as being further provided with stops 63A, 63B extending rightwardly from their right faces and arranged to abut the leftwardly-facing right walls of their associated cylinders, and stops 64A, 64B extending leftwardly from their left faces and arranged to abut the rightwardly-facing walls of the chambers in which levers 58A, 58B are mounted.

Each of rectifier pistons 60A, 60B is mounted for free sliding movement in its associated cylinder within a range of movement determined by the stops 63A, 64A and 63B, 64B. Ideally, both servovalves will have "matched" control pressures $P_{1A}$, $P_{1B}$, and these control pressures are applied to the opposite circular end faces of the pistons.

However, if control pressure $P_{1B}$ of right valve 50B falls below the comparable control pressure $P_{1A}$ of left valve 50A, the pressure differential therebetween ($P_{1A} - P_{1B}$) will cause the left rectifier piston 60A to move rightwardly, separating from its contact with the lower end of lever 58A; and the right rectifier piston 59B will move leftwardly, pushing the lower end of lever 58B and urging the lever to pivot in a clockwise direction. This action has no effect on the left spool, but causes the right spool 56B to move rightwardly relative to its chamber, in a manner proportional to the magnitude of the differential pressure because of the finite stiffness of the spool positioning loop, so as to further uncover control port $C_{1B}$. Thus, in the event of a "mismatch" between outputs $P_{1A}$ and $P_{1B}$, the improved equalizer functions to adjust that valve which is producing the lower output pressure, so as to have its adjusted pressure increase to substantially equal that of the other valve. Of course, if the pressure supplied by left valve 50A were to fall below that supplied by the right valve 50B, the operation would be reversed. Again, the two control pressures are "force-opposed" in the equalizer pistons, but "force-summed" in the actuator. Also, each rectifier piston has a "dead" zone, within which displacement of the rectifier piston does not produce corrective movement of the valve spool, and a "sensitive" zone, within which such corrective adjustment may occur.

Figure 4:
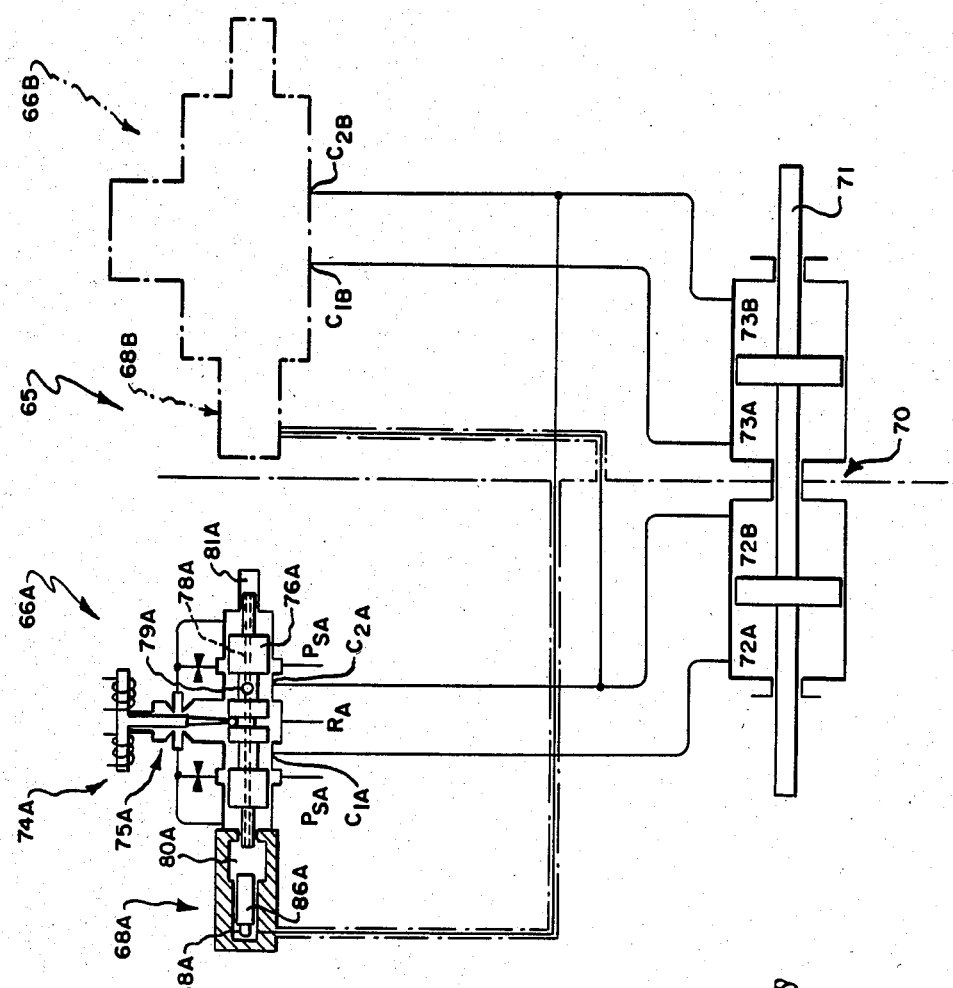
FIG. 4 is a simplified schematic of a second modification.

Second Modification (FIG. 4)

FIG. 4 depicts another servosystem 65, which broadly includes two servovalves 66A, 66B, two modified equalizers 68A, 68B associated with the servovalves and a tandem actuator 70. Actuator 70 has two separate pistons mounted on a common rod 71. The left piston separates opposing chambers 72A, 72B, and the right piston separates opposing chambers 73A, 73B. Inasmuch as both servovalves are identical, only the structure of the leftward system will be discussed.

Servovalve 66A is schematically shown as including a torque motor 74A, a first-stage fluid amplifier 75A, and a second-stage sliding spool member 76A. Supply pressure $P_{SA}$ is provided through restricted orifices to the amplifier, and a differential pressure, determined by the position of a flapper relative to a pair of opposed nozzles, is supplied to the spool end chambers for selectively displacing spool 76A relative to the body. The various spool lobes are arranged to cover supply ports, a common return port, and two control ports $C_{1A}$, $C_{2A}$, when the spool is in its centered position. Should the spool move rightwardly from the position shown, control port $C_{1A}$ will communicate with return $R_A$, and control port $C_{2A}$ will communicate with right pressure supply $P_{SA}$. Conversely, if the spool were to move leftwardly from the position shown, control port $C_{1A}$ would communicate with left supply $P_{SA}$, and control port $C_{2A}$ would communicate with return. The pressures at control ports $C_{1A}$ and $C_{2A}$ are denominated pressures $P_{1A}$ and $P_{2A}$, respectively. Similarly, the pressures at control ports $C_{1B}$ and $C_{2B}$ are denominated pressures $P_{1B}$ and $P_{2B}$, respectively. Spool 76A is provided with an axial through-hole 78A, which is intersected by a radial hole 79A in constant communication with control port $C_{2A}$. Thus, at all times, the pressure at control port $C_{2A}$ will exist in the stem end chambers 80A, 81A of spool 76. Since the end faces of the valve stem are of equal areas, like pressures in stem end chambers 80A, 81A will not affect spool position.

The equalizer 68A includes a rectifier element in the form of a piston 86A slidably mounted in a cylinder. Control pressure $P_{2A}$ in stem left chamber 80A is applied to the right end face of rectifier piston 86A, and control pressure $P_{2B}$ from servovalve 66B is applied to its left face. Rectifier piston 86A has a stop 88 extending leftwardly from its left face to selectively abut the chamber left wall. The right face of rectifier piston 86A may selectively abut the left end face of the stem of valve spool 76A.

Rectifier piston 68A is, therefore, operatively arranged to sense a differential between control pressures $P_{2A}$ and $P_{2B}$. If pressure $P_{2A}$ is greater than pressure $P_{2B}$, the rectifier piston 86A will be driven leftwardly, until its stop 88A bottoms on the chamber left wall. In this condition, rectifier piston 86A will not interfere with normal movement of valve spool 76A. However, the other rectifier piston (not shown) will be driven rightwardly to engage the spool (not shown) of valve 66B, urging it to move rightwardly to increase the pressure of valve 66B.

On the other hand, if pressure $P_{2B}$ is greater than pressure $P_{2A}$, the rectifier piston of equalizer 68B will separate from the spool of valve 66B, and will bottom against its chamber end wall. However, the polarity of this pressure differential will drive left equalizer piston 86A rightwardly to engage the stem of spool 76A, and move the spool rightwardly in a manner proportional to the magnitude of the pressure differential because of the finite stiffness of the spool positioning loop, to increase control pressure $P_{2A}$.

Thus, in this embodiment, the rectifier pistons again have "dead" and "sensitive" zones of movement, and function to cause the valve which is producing the lower pressure to be adjusted so as to produce an increased pressure substantially equal to that of the other valve. This embodiment has the additional advantage of allowing continued actuator performance via provision of one or more bypass valves (not shown) despite a loss of supply pressure to either servovalve.

Figure 5:
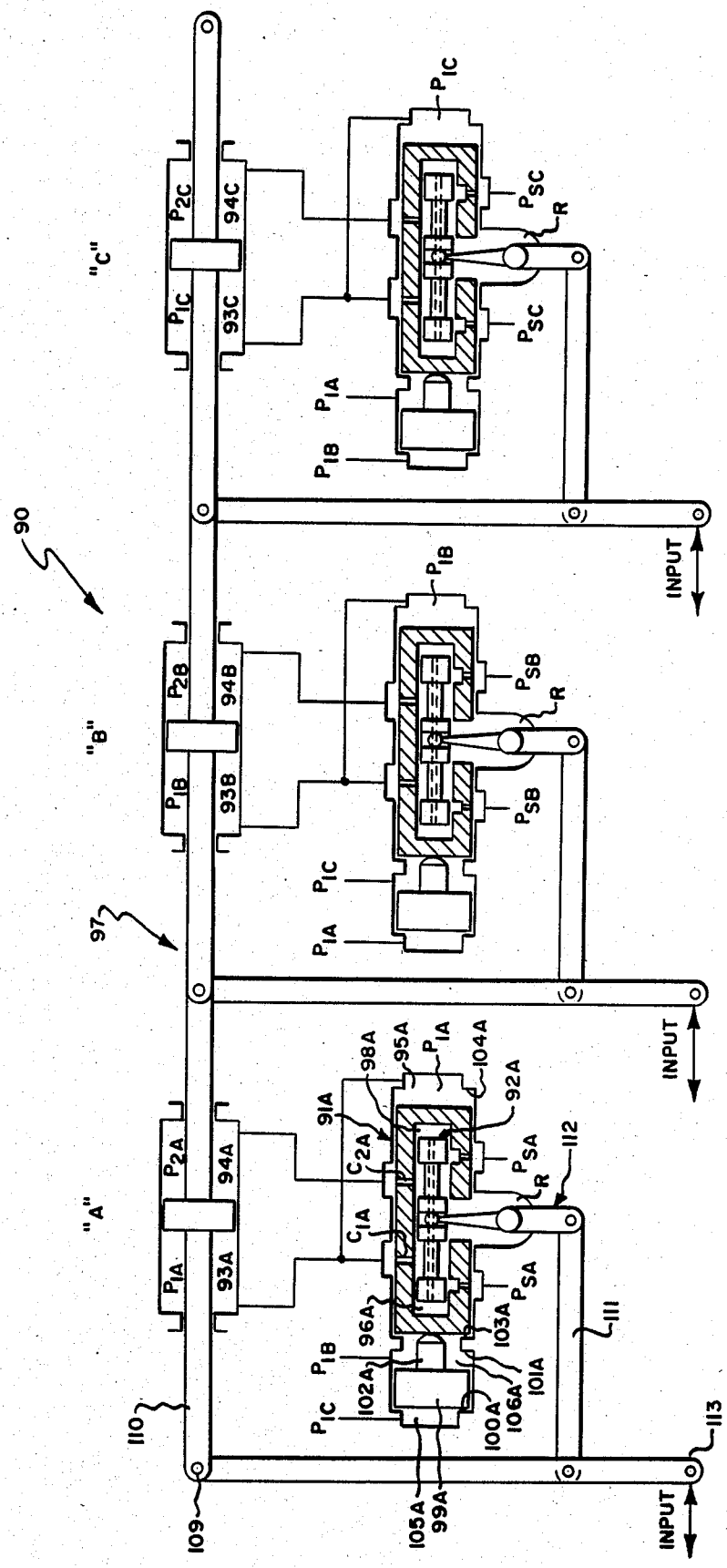
FIG. 5 is a simplified schematic of a third modification, as applied to a triplex system.

Triplex Application (FIG. 5)

FIG. 5 shows the concept of the improved equalizer as applied to a triplex redundant control system, generally indicated at 90.

Control system 90 comprises three like control units having their actuator rods connected together to provide a triple tandem actuator. For convenience, the same reference numeral will be used to identify the same structure, with subscripts "A", "B" and "C" distinguishing between the three control units.

Each control unit has a sleeve member 91 mounted for free sliding movement within a body, and further has a spool member 92 selectively movable within the associated sleeve. The sleeve has a supply port on either side of a return port, and these are in continuous communication with supply and return passages provided in the body. The sleeve also has one control port $C_1$ arranged between the left supply port and the return port, and another control port $C_2$ arranged between the return port and the right side supply port. Each unit of the triple tandem actuator has a piston slidably mounted in a cylinder and separating a chamber 93 on its left side from another chamber 94 on its right side. Control ports $C_1$ communicate with right chambers 93, and control ports $C_2$ communicate with left chambers 94. The pressures at control ports $C_{1A}$ and $C_{2A}$ are denominated pressures $P_{1A}$ and $P_{2A}$, respectively, and are further identified by the additional subscripts A, B or C, as appropriate. Thus, the individual actuators of each control unit are connected together so as to provide a "force-summed" triple tandem actuator, collectively indicated at 97.

Each spool member 92 has three lobes. When the spool is nulled on its sleeve, the left spool lobe is adapted to cover the sleeve left supply port, the intermediate spool lobe is adapted to cover the central sleeve return port, and the right spool lobe is adapted to cover the sleeve right supply port. The pressure $P_{1A}$, $P_{1B}$, $P_{1C}$ in each actuator right chamber (94A, 94B, 94C) is provided to an end chamber (95A, 95B, 95C) between the body and the right end face of the associated sleeve. Thus, the pressure $P_{1A}$ in actuator chamber 94A is provided to sleeve end chamber 95A to act on the right face of sleeve 91A, and so on for units "B" and "C".

Each spool 92 is provided with an axial through-hole communicating the left and right end chambers 96, 98 between the spool and its associated sleeve.

A rectifier element in the form of a piston 99 is associated with each sleeve. Each rectifier piston is mounted in a body chamber for free sliding movement between a left stop 100 and a right stop 101. An axial pin 102 extends rightwardly from the right face of each piston, and is adapted to be engaged by the left end face of the associated sleeve. The axial distance between the left face of each rectifier piston and the tip of the projecting pin, is approximately equal to the axial distance between stops 100 and 101. When the rectifier piston abuts left stop 100, sleeve 91 abuts its left stop 103. Each sleeve may move rightwardly to abut a right stop 104. The left face of each rectifier piston faces into a chamber 105. The right face of each rectifier piston and pin 102, face into another chamber 106 between the rectifier piston, the body, and the left end face of the sleeve. The diameters of the rectifier pistons are equal to the diameters of the sleeves.

Chamber 105A communicates with actuator chamber 94C; chamber 106A communicates with actuator chamber 94B; and sleeve end chamber 95A communicates with actuator chamber 94A. Chamber 105B communicates with actuator chamber 94A; chamber 106B communicates with actuator chamber 94C; and sleeve end chamber 95B communicates with actuator chamber 94B. Chamber 105C communicates with actuator chamber 94B; chamber 106C communicates with actuator chamber 94A; and sleeve end chamber 95C communicates with actuator chamber 94C.

Each control unit includes a summing lever 108. The upper end 109 of each summing lever is pivotally connected to the left marginal end of its actuator rod 110. A connecting rod 111 has its left marginal end pivotally connected to an intermediate portion of lever 108, and has its right marginal end pivotally connected to the lower end of an intermediately-pivoted lever 112. The upper end of lever 112 has a spherical ball suitably captured with a complementary recess provided in the spool's central lobe. Each summing lever receives an input in the form of a horizontal push or pull movement of its lower end 113. Such input motion causes the lever 108 to pivot about its upper connection with actuator rod 110, and causes displacement of the spool relative to the sleeve via connecting rod 111 and lever 112. Leftward movement of the spool relative to the sleeve uncovers the left sleeve supply port, and allows flow from body source $P_{SA}$ into chamber 94A. Chamber 93A communicates with body return $R_A$ through the nowuncovered sleeve return port. Thus, for example, rightward movement of the lower end of summing lever 108 causes leftward movement of the spool, and leftward movement of the actuator rod 110. If the summing lever lower end is held in its rightwardly-displaced position, the resultant leftward movement of actuator rod 110 will ultimately restore the spool to its nulled position relative to the sleeve. Thus, the summing lever provides mechanical feedback between the mechanical command displacement of lever end 113, the spool, and the actuator. In short, were it not for them being coupled together, each actuator rod 110 would move to a position proportional to the extent of command displacement of the lever lower end 113. The "gain" of each control unit is determined by the lengths of the arms between the lever's connection with connecting rod 111, and the lever's marginal ends. The three summing levers are coupled together to receive essentially equal inputs.

As with the embodiments heretofore described, control system 90 functions to compare the outputs of the three valves in terms of the pressures in chambers 94A, 94B and 94C, and to cause any valve(s) which is/(are) producing a lower pressure output to be adjusted so as to substantially equal the higher pressure of a valve, which serves as a reference.

Assume that pressure $P_{1A}$ is greater than pressure $P_{1B}$, which in turn is greater than pressure $P_{1C}$. In control unit "A", a first differential pressure $(P_{1A}-P_{1B})$ will drive the sleeve leftwardly against stop 103. A second differential pressure $(P_{1B}-P_{1C})$ will drive rectifier piston 99A leftwardly against its stop 100 (if it is not already there). In control unit "B", a first pressure differential $(P_{1A}-P_{1C})$ will move rectifier piston 99B against sleeve 91B. One rectifier piston 99B is in contact with sleeve 91B then a second pressure differential $(P_{1A}-P_{1B})$ will drive rectifier piston 99B sleeve 91B rightwardly and/as a subassembly further uncovering the sleeve supply port and thereby increasing $P_{1B}$, until $P_{1B}$ equals $P_{1A}$. In control unit "C", a first pressure differential $(P_{1A}-P_{1B})$ drives the rectifier piston 99C leftwardly against stop 100C, and a second pressure differential $(P_{1A1C})$ drives sleeve 91C rightwardly, further uncovering the sleeve supply port and thereby increasing $P_{1C}$, until $P_{1C}$ ultimately equals $P_{1A}$. Thus, the improved equalizer has adjusted control units "B" and "C" so that their output pressures $P_{1B}$ and $P_{1C}$ will equal the higher pressure of $P_{1A}$. Of course, if either unit "B" or "C" provided the higher control pressure, then the other units would be correspondingly adjusted in a similar manner.

Therefore, the present invention broadly provides an improved equalizer which functions to equalize the hydraulic outputs of two or more valves. While duplex and triplex units have been shown and described, the improved equalizer may be readily applied to quadruplex and higher order systems. The equalized outputs need not necessarily be "force summed", or even applied to a common actuator. The invention contemplates that the lower pressure output(s) of one or more valve(s) may be "equalized up" to the higher pressure of a reference valve or, alternatively, that the higher pressure output(s) of one or more valve(s) be "equalized down" to the lower pressure of a reference valve.

Accordingly, while the presently-preferred embodiment and several desirable modifications thereof have been shown and described, persons skilled in this art will readily appreciate that various additional changes and modifications may be made without departing from the scope of the invention, as defined and differentiated by the following claims.

What is claimed is:

1. In apparatus having a first valve and a second valve, each of said valves being adapted to communicate with a source of pressurized fluid and having one member movable relative to another member to regulate a controlled pressure, the improvement comprising:
   an equalizer arranged to sense said controlled pressures and operative, in the event of a differential therebetween, to cause the relative position of the members of one valve to be adjusted so that the controlled pressure of said one valve will be biased to substantially equal the controlled pressure of the other valve, said equalizer including
   a sensing actuator supplied with said controlled pressures and movable, within a permissible range of movement, to a position responsive to the polarity and magnitude of a differential between said controlled pressures, and
   a first rectifier element sensitive to the position of said sensing actuator within a first portion of said permissible range but insensitive to the position of said sensing actuator beyond said first portion, said first rectifier element being operative to cause the members of said one valve to be adjusted.

2. The improvement as set forth in claim 1 wherein said first rectifier element is movable with said sensing actuator within first portion.

3. The improvement as set forth in claim 2 wherein said first rectifier element does not move with said sensing actuator beyond said first portion.

4. The improvement as set forth in claim 3 and further comprising a stop operatively arranged to permit movement of said first rectifier element within said first portion, but to prevent said first rectifier element from moving beyond said first portion.

5. The improvement as set forth in claim 1 wherein said one valve is an electrohydraulic servovalve, and wherein said first rectifier element is arranged to supply an electrical feedback signal to said servovalve.

6. The improvement as set forth in claim 1 wherein said equalizer further includes:
   a second rectifier element sensitive to the position of said sensing actuator within a second portion of said permissible range but insensitive to the position of said sensing actuator beyond said second portion, said second rectifier element being operative to cause the members of said other valve to be adjusted.

7. The improvement as set forth in claim 6 wherein said first and second portions together comprise the permissible range of movement of said sensing actuator.

8. In apparatus having a first valve and second valve, each of said valves being adapted to communicate with a source of pressurized fluid and having one member movable relative to another member to regulate a controlled pressure, the improvement comprising:
- an equalizer arranged to sense said controlled pressures and operative, in the event of a differential therebetween, to cause the relative positions of the members of one valve to be adjusted so that the controlled pressure of said one valve will be biased to substantially equal the controlled pressure of the other valve, said equalizer including
- a sensing actuator supplied with said controlled pressures and movable to either side of a null position in response to the polarity and magnitude of differential between said controlled pressures, and
- a first rectifier element responsive only to the displacement of said sensing means to one side of said null position in response to the magnitude of one polar differential between said controlled pressures and operative to cause the members of said one valve to be adjusted.

9. The improvement as set forth in claim 8 and further comprising:
- a second rectifier responsive only to the displacement of said sensing means to the other side of said null position in response to the magnitude of an opposite polar differential between said controlled pressures and operative to cause the members of said other valve to be adjusted.

10. In an apparatus having a first valve and a second valve, each of said valves being adapted to communicate with a source of pressurized fluid and having one member movable relative to another member to regulate a controlled pressure, the improvement comprising:
- an equalizer arranged to sense each of said controlled pressures and operative in the event of a differential therebetween, to cause the relative positions of the members of one valve to be adjusted so that the controlled pressure of said one valve will be biased to equal the controlled pressure of the other valve, said equalizer including
- a sensor for determining the magnitude and polarity of a differential between said controlled pressures,
- a first rectifier associated with said sensor and with said first valve, said first rectifier being sensitive to the magnitude of any sensed differential of one polarity but insensitive to the magnitude of any sensed differential of the opposite polarity, and
- a second rectifier associated with said sensor and said second valve, said second rectifier being sensitive to the magnitude of any sensed differential of said opposite polarity but insensitive to the magnitude of any sensed differential of said one polarity.

11. The improvement as set forth in claim 10 wherein said sensor is movable to a position responsive to the polarity and magnitude of any differential between said controlled pressures.

12. The improvement as set forth in claim 11 wherein said sensor includes a piston, and wherein said controlled pressures are applied to the opposite faces of said piston such that the position of said piston will indicate the polarity and magnitude of any differential between said controlled pressures.

13. The improvement as set forth in claim 10 wherein each rectifier is a follower mounted for selective movement with said sensor.

14. The improvement as set forth in claim 13 wherein each of said valves is an electrohydraulic servovalve, and wherein said first rectifier is arranged to supply a feedback signal to said first valve and said second rectifier element is arranged to supply a feedback signal to said second valve.

15. In apparatus for controlling the operation of a tandem actuator, said apparatus having first and second servovalves, each of said servovalves being adapted to communicate with a source of pressurized fluid and having one member movable relative to another member to regulate a controlled pressure, having first feedback means operatively arranged between said tandem actuator and said first servovalve, and having second feedback means operatively arranged between said tandem actuator and said second servovalve, the improvement comprising:
- an equalizer arranged to sense said controlled pressures and operative, in the event of a differential therebetween, to cause th relative positions of the members of one servovalve to be adjusted so that the controlled pressure of such adjusted servovalve will be biased to substantially equal the controlled pressure of the unadjusted servovalve, said equalizer including
- a first rectifier arranged to be moved within a first range of movement and operative to provide a feedback signal to said first servovalve proportional to the position of said first rectifier within said first range,
- a second rectifier arranged to be moved within a second range of movement and operative to provide a feedback signal to said second servovalve proportional to the position of said second rectifier within said second range, said first and second ranges being non-overlapping, and
- a sensing actuator supplied with said controlled pressures and movable within a maximum permissible range of movement, which includes said first and second ranges, to a position responsive to the polarity and magnitude of a differential between said controlled pressures,
- whereby, in the event of a differential between said controlled pressures, said sensing actuator may selectively displace either one or the other of said rectifiers, depending on the polarity and magnitude of said differential.

16. In a closed-loop position servomechanism having first and second force-summed actuators, and having first and second servovalves, each of said servovalves being adapted to communicate with a source of pressurized fluid and having one member movable relative to another member to regulate a controlled pressure, the controlled pressure of said first servovalve being supplied to said first actuator and the controlled pressure of said second servovalve being supplied to said second actuator, the improvement which comprises:
- an equalizer arranged to sense said controlled pressures and operative, in the event of a differential therebetween, to cause the relative positions of the members of one or the other of said servovalves to be individually adjusted so that the controlled pressure of such adjusted servovalve will be biased to substantially equal the controlled pressure of the other unadjusted valve, said equalizer including
- a sensor for determining the magnitude and polarity of a differential between said controlled pressures,
- a first rectifier associated with said sensor and with said first servovalve, said first rectifier being sensitive to the magnitude of any sensed differential of one polarity but insensitive to the magnitude of any such sensed differential of the oppossite polarity, and a second rectifier associated with said sensor and with said second valve, said second rectifier being sensitive to the magnitude of any sensed differential of said opposite polarity but insensitive to the magnitude of any sensed differential of said one polarity, thereby to avoid force-fighting due to mismatched controlled pressures.

17. The improvement as set forth in claim 16 wherein the servovalve which was providing the lower controlled pressure is adjusted.

18. The improvement as set forth in claim 16 wherein the servovalve which was providing the high controlled pressured is adjusted.

19. In apparatus having only two valves, each of said valves being adapted to communicate with a source of pressurized fluid and operable to regulate a control pressure, the improvement which comprises:

an equalizer operatively arranged to sense to the controlled pressures of said valves and operative, in the event of a sensed differential therebetween, to adjust only that valve which is providing a lower controlled pressure so that the controlled pressure of such adjusted valve will be biased to substantially equal the controlled pressure of the non-adjusted other valve which is providing the highest controlled pressure, thereby to cause each of said valves to provide regulated controlled pressures which are substantially equal.

20. In apparatus having only two valves, each of said valves being adapted to communicate with a source of pressurized fluid and operable to regulate a controlled pressure, the improvement which comprises:

an equalizer operatively arranged to sense the controlled pressures of said valve and operative, in the event of a sensed differential therebetween, to adjust only that valve which is providing a higher controlled pressure so that the controlled pressure of such adjusted valve will be biased to substantially equal the controlled pressure of the non-adjusted other valve which is providing the lowest controlled pressure, thereby to cause each of said valves to provide regulated controlled pressures which are substantially equal.

* * * * *